Patented Nov. 13, 1945

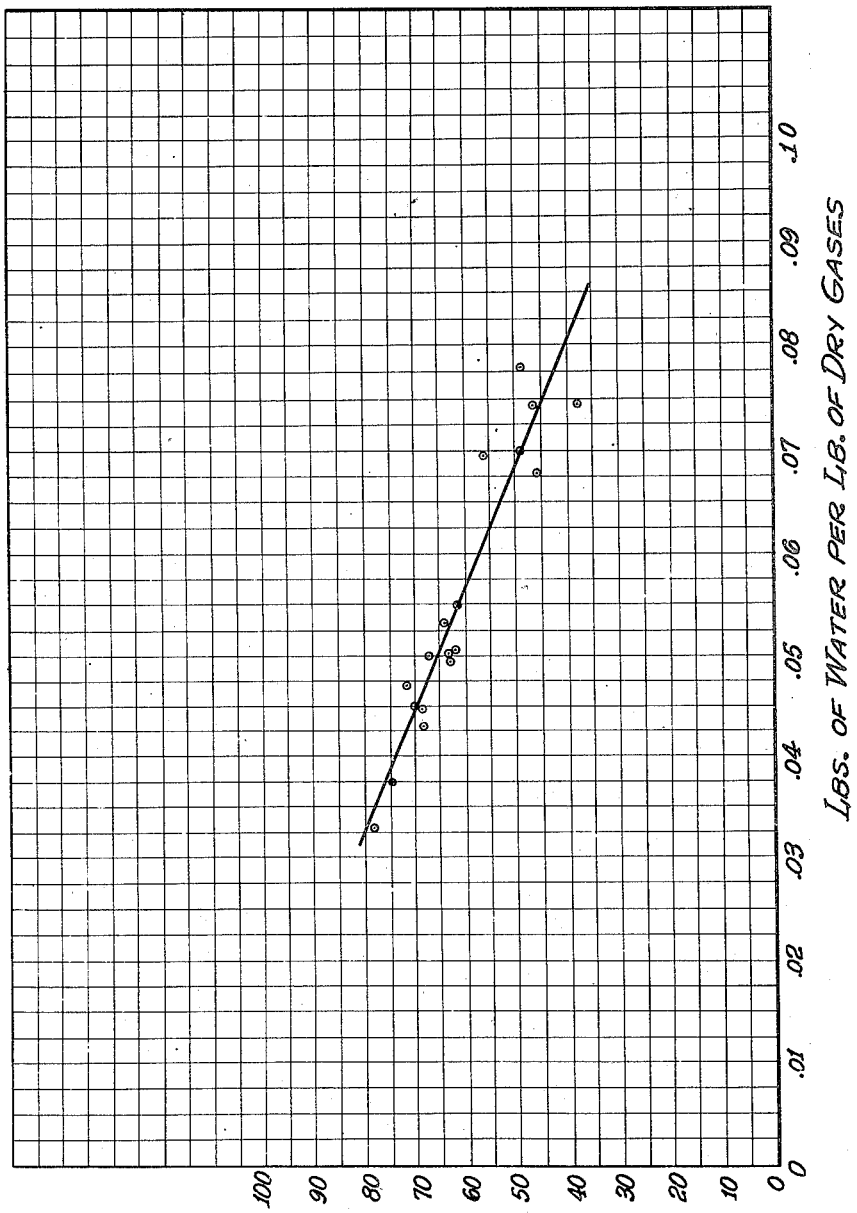

2,388,735

UNITED STATES PATENT OFFICE 2,388,735

METHOD OF DRYING PELLETED CATALYST

Wright W. Gary, Los Angeles, and Robert B. Secor, South Gate, Calif., assignors to Filtrol Corporation, Los Angeles, Calif., a corporation of Delaware Application July 3, 1943, Serial No. 493,490

9 Claims. (Cl. 34—31)

Modern catalytic processes require catalysts which are not only specifically active in the chemical reactions which are to be catalyzed, but also possess physical characteristics required for successful commercial operation. Of importance is hardness; that is, resistance to attrition. The ability of a particle to hold its shape notwithstanding the mechanical handling to which it is subjected in storage, shipment, and use is an important requirement for a successful catalyst for modern catalytic processes.

In moving bed-type processes, the bed of catalyst is in continuous motion. Spent catalyst is continuously discharged from the bottom of the catalytic reactor and fresh catalyst is continuously fed into the top of the reactor. The spent catalyst is regenerated in a regenerating zone and returned to the catalyst reactor. In this form of process the mechanical strength of the catalyst is of importance since in its motion through the reactor it is subjected to considerable crushing and abrasion forces. It is also subjected to these forces in its passage to and through the regeneration zone and in its passage to the catalyst reactor. In this type of process it has been found most useful to employ the catalyst in pellet form. The strength of the catalyst pellet as well as the characteristics of the individual particles which make up the pellets are of importance.

A particularly useful catalyst especially active in the conversion of hydrocarbons, such as a catalytic cracking process, are the acid-treated montmorillonite clays of the sub-bentonite form. These native clays when treated with dilute acids such as dilute sulphuric acid have their decolorizing power considerably enhanced. This same treatment also develops high catalytic activity.

Hardness as employed in this specification and in the claims hereof may be evaluated by the following test procedure:

The pellets are calcined in the following manner. They are placed in a cold oven or at room temperature and the oven temperature is raised to 1050° F. over a period of three and one-half hours, observing the following temperature schedules: Starting with room temperature or approximately 85° F., the oven is heated so that after 20 minutes the furnace is raised to 125° F., after 40 minutes to 200° F., and thereafter the oven is raised in temperature 100° F. every 20 minutes until a temperature of 1050° F. is reached. This takes three and one-half hours. The pellets are maintained at 1050° F. for an additional four hours, or for a total heating time of seven and one-half hours. The material is removed into desiccator and cooled.

Measure 80 cc.'s of the screened calcined pelleted catalyst into a 100 cc. graduated cylinder, tapping to constant volume, and transfer from cylinder to a balance, and weigh to the nearest $\frac{1}{10}$ gram. Place the catalyst sample and eight $\frac{5}{8}$" steel balls in a can $3\frac{1}{2}$" in diameter and $3\frac{3}{4}$" long, and close securely. Rotate the can for one hour at 80 R. P. M. Remove the catalyst from the can and screen in No. 6 mesh Tyler screen. Weigh the catalyst remaining on the screen and in the pan underneath the No. 6 screen. The hardness index is reported as the weight per cent on the No. 6 Tyler screen divided by the total weight of the catalyst used times 100.

By the terms "volatile matter content," or "per cent volatile matter," or "V. M." are meant the per cent content of water as determined by the following test procedure:

Five grams of the catalyst are placed into a 20 cc. crucible and ignited in an electric furnace for 30 minutes at a temperature of at least 1800° F. and cooled in a desiccator.

$$\text{Percent volatile matter} = \frac{\text{loss of weight} \times 100}{\text{weight of ignited clay}}$$

We have found that the drying operation to which the pelleted material is subjected has a material effect on the hardness of the pellet. A useful type of drying is the so-called rotary kiln method of drying. In this type of apparatus the pellets are fed through a rotating drum through which hot combustion gases are passed counter-currently. The rotation of the drum causes the pellets to shower down through the hot gases transversely of their flow and at the same time to move in a counter-current direction to the flow. The drying of the pellets depends on the rate of feed of the pellets to the drier, the retention time of the pellets in the kiln, the rate of travel of the drying gases, i. e., the draft, the temperature of the gases at the discharge end and at the hot end of the drier. These factors not only control the V. M. content of the dried pellets, but also control the moisture content of the gases discharged from the drier. These discharged gases are in contact with the pellets fed into the drier.

We have found that the hardness of the pellets depends upon the moisture content of the discharged gases. We have found that if the kiln is operated so as to obtain discharged gases having a low moisture content, we obtain harder pellets than if the discharged gases have a high moisture content.

The longer the time, the higher the draft rate, i. e., the greater the volume of hot gases passing through the kiln, and the higher the temperature, the greater the rate of water evaporation. However, the water content of the gases will depend on the ratio of the water evaporated to the draft. However, if the volume of the gases passing per unit of time is low, the water content of the exiting gases will be greater than if the same amount of water evaporated were removed with a higher rate of gas flow. By controlling the factors of feed rate of the pellets, volume and temperature of the draft, and retention time of the pellets in the drier, exiting gases of varying moisture content may be obtained.

In the following examples, we illustrate our discovery in the production of pellets dried to various V. M. content, carrying from 7 to 27% under varying conditions of draft and temperature and time so controlled to give various moisture contents in the exiting gases. The resulting pellets were all tested for hardness by the method detailed above. It will be observed that as the operations were conducted to give drier exiting gases, pellets of greater hardness were obtained.

In the drawing the single figure is a chart showing the relation of the hardness of pellets, dried under conditions giving exit gases of various moisture content.

The material processed may be any form of pelletable catalyst. It is preferably an acid-treated sub-bentonite, as previously described. Characteristic examples of such clay are the so-called Cheto clays or Chambers clays coming from the vicinity of Cheto, Arizona, or Chisholm clay, coming from near Jackson, Mississippi. The Cheto clays, for example, have a characteristic analysis upon a volatile free basis as follows:

| | Percent by weight |
|---|---|
| $SiO_2$ | 67.3 |
| $Al_2O_3$ | 19.5 |
| $Fe_2O_3$ | 1.8 |
| $CaO$ | 3.2 |
| $MgO$ | 6.9 |
| $MnO$ | 0.8 |
| $Na_2O$ | 0.2 |

Such clays are treated with acid ranging from about 20 pounds of $H_2SO_4$ per 100 pounds of clay (calculated as volatile free) to about 150 pounds of acid per 100 pounds of clay (calculated as volatile free). Concentrations of acid may vary from 5% to 60% calculated upon the total water of the mix including the water content of the clay charged to the acid treatment. Time and temperature are adjusted to obtain the desired degree of extraction.

For example, the clay may be treated with 30 pounds of acid (calculated 100% $H_2SO_4$) per 100 pounds of clay calculated as volatile free at a concentration of about 12% calculated upon the total water content of the mix including the water content of the clay charged to the mix. Time of extraction is about six hours at a temperature of about 200–215° F. A desirable degree of extraction is such as to give final content of $Al_2O_3$ and $Fe_2O_3$ at about 10% to 20%, preferably about 15% to 20%. Characteristic analysis of the Cheto clay previously identified treated to the desired degree of extraction, based upon volatile free clay, is as follows:

| | Percent |
|---|---|
| $SiO_2$ | 71.5 |
| $Al_2O_3$ | 16.3 |
| $Fe_2O_3$ | 2.43 |
| $CaO$ | 2.26 |
| $MgO$ | 4.54 |

This clay is washed substantially free of acid and salts with water, filtered and dried to a moisture content of about 15% to 20%, for example, 18%, and ground to a powder. This clay is mixed with water to form a plastic mass suitable for extrusion. The water content is adjusted so that the mix fed to the extruders, as later described, has the desired moisture content to give the hardness and densities which are desired. The range of water content of the clay passed to the extruders is from about 40% to 50%. The moisture content of the pellet-mix also affects the hardness of the pellet and should be adjusted to give the optimum hardness. For the clay used in the illustration, this will be about 45% to 47%, i. e., about 45%.

The mixture is extruded in an extruder, such as a screw-type extruder, which forces the moistened clay through an apertured orifice to give pellets. In the following examples the pellets were $\frac{1}{16}$" in diameter and $\frac{1}{16}$" long. The wet pellets of about 46% V. M. were fed to the rotary kiln drier.

This drier which is a conventional type of drier consists of an inclined drum rotated by means of an external worm and worm gear and suitably supported at a dutch oven and a stack. The wet pellets are fed from a hopper via a screw feed or other suitable feeding device into the rotating drum, the drier. Hot gases are generated by passing fuel through the burner. Primary air for combustion is fed to the burner. Secondary air is fed through an auxiliary inlet to the drum. The hot gases of combustion are introduced into the drum at a point contiguous to the outlet of the dry pellets and pass over the pellets which are showered during the rotation of the drum. The gases pass in a general direction counter-current to the pellet travel through the drier. The combustion gases carrying the moisture evaporated from the pellet exit via the exhaust vent from drum at the point at which the wet pellets are fed via a fan and discharge into stack. The dry pellets discharge through outlet near the point of entrance of the hot gases.

The pellet-detention time in the drier is controlled by the rate of feed of the pellet to the drier and the rate of rotation of the drum. The draft, i. e., the volume of gas passing through the drier, is controlled by the rate of feed of air and gas to the burner and the stack draft created by the fan. The temperature of the inlet gases is controlled by the burner action, and the draft and the temperature and moisture content of the exit gases leaving the drier depend on the moisture content and rate of feed of the wet pellets to the drier, the detention time in the drier, the temperature at the inlet, the volume flow of gases generated by the burner and the draft. The factors of temperature, retention time, draft and moisture content of the end gases are here termed "drying factors."

We have found that in order to obtain a hardness in excess of about 50, these factors should be controlled to obtain a gas passing to the stack which will contain less than about .05 to .07 pound of water per pound of dry gas. Higher hardness is obtained by so controlling the drying factors to obtain stack gases of still lower moisture content. Thus, by controlling the drying factors to give moisture content in the region of .05 to .03 or less, we can get hardnesses above 50 and as high as 70 to 80 or greater.

This will be illustrated by the following examples tabulated below. In the table are tabulated examples in which the drying factors are controlled to give a moisture content ranging from about .08 to .03 pound of water per pound of dry gas. In this table the feed rate is measured in pounds of wet pellets fed to the drier per hour.

The retention time is that time taken by an individual pellet to travel from the pellet inlet to the drier to the discharge from the drier.

Temperature at the hot end of the drier is the temperature reached in the drier near the point of introduction of the hot gas. Temperature feed end is the temperature at the point where the pellets enter the drier and the gases are discharged from the drier. Stack-gas moisture content is obtained by taking the dry bulb and wet bulb temperatures for the gases as discharged from the drier and determining their moisture content from psychrometric charts for air. Hardness and per cent V. M. are determined in the manner described above. The pellets fed to the drier in each of the examples had a V. M. content of about 46%, ranging from 45% to 47%. The V. M. given in the table is that of the dry pellet discharged from the drier before calcining.

nesses in the range of 50 or higher, the drying factors should be so controlled as to give a moisture content in the range of not less than about .09.

To obtain hardnesses in the range of 70 to 80 or higher the moisture content should be at least about .06 pound of moisture per pound of dry gases. The median value of the hardnesses which we obtained in such operation is as given in the table and the figure. By controlling the drying factors to give gases having a moisture content of .0675 pound of moisture per pound of dry gas or less, we obtained a median value of hardness of 50 or higher, but by operating at a moisture content of .045 of water per pound of dry gases, we obtained a median value of hardness of 70 or higher.

We claim:

1. A method for drying pelleted acid-treated

TABLE.—Pellets 45–47

| Example | Feed rate, lbs. wet pellet per hour | Retention time in minutes | Temperature hot end | Temperature feed end | Stack gases, lbs. of water per lb. of dry gases | Calcined hardness | V. M. of dried pellet |
|---|---|---|---|---|---|---|---|
| 1 | 30 | 145 | 325 | 163 | 0.033 | 79.3 | 8.7 |
| 2 | 30 | 145 | 338 | 256 | .037 | 74.6 | 8.2 |
| 3 | 20 | 55 | 312 | 172 | .043 | 68.6 | 13 |
| 4 | 30 | 67 | 405 | 184 | .044 | 68.9 | 15.4 |
| 5 | 30 | 67 | 310 | 168 | .045 | 70 | 21.9 |
| 6 | 20 | 80 | 323 | 180 | .047 | 71.8 | 14.6 |
| 7 | 20 | 55 | 318 | 177 | .049 | 63 | 12.5 |
| 8 | 30 | 82 | 373 | 178 | .050 | 63.1 | 13.9 |
| 9 | 20 | 55 | 318 | 178 | .050 | 67.4 | 16 |
| 10 | 20 | 46 | 373 | 197 | .051 | 61.6 | 11.3 |
| 11 | 20 | 46 | 357 | 194 | .053 | 64.5 | 13.8 |
| 12 | 50 | 55 | 350 | 196 | .054 | 60.8 | 33.9 |
| 13 | 40 | 45 | 405 | 175 | .068 | 45.6 | 21.9 |
| 14 | 25 |  | 480 | 263 | .069 | 55.4 | 14.3 |
| 15 | 40 | 45 | 390 | 204 | .070 | 48.5 | 18.5 |
| 16 | 40 | 45 | 393 | 199 | .074 | 46 | 19.5 |
| 17 | 40 | 45 | 395 | 200 | .074 | 38.7 | 18.5 |
| 18 | 60 | 33 |  |  | .078 | 49.5 | 35.1 |

The data of the table are charted on the figure.

It is to be observed that the examples given above represent only a portion of a large number of experiments and represent those runs which correspond to the median values of the hardnesses and moisture contents. Individual runs were obtained which deviated from the straight line relationship shown by the figure, as would be expected from the nature of the operation. The relationship shown in the figure, however, represents the average value which we believe is an engineering approximation of the true relationship of the hardness to the drying conditions. We have found that the hardness obtained for various values of the moisture content of the stack gases will lie within a range of about ±10 units, or, stated differently, for different hardness, the moisture content required to obtain the same hardness may vary about ±.02 pound of water per pound of dry gases from that shown in the figure. This represents the range of scattering of points obtained in various runs on both sides of the line which represents the runs given in table and charted in the figure. These runs are those which correspond to the median values of all the hardnesses and moisture content of the gases for the scores of runs made. They are therefore representative and average values.

It will be observed that these median runs gave hardnesses in excess of 50 when the drying factors were so controlled as to give a moisture content in the gases of at least .0675 and about 60 when the moisture content was about .055. Giving effect to the range of hardness to be expected these results show that to obtain hardclay catalyst, which comprises passing moist pellets counter-current to a stream of hot gases, removing moist gases from the pellets, and controlling the factors of temperature and detention time, draft and moisture content of the end gases so that the gases which are removed from the pellets contain less than about .05 to .07 pound of water per pound of dry gas.

2. A method for drying pelleted acid-treated clay catalyst, which comprises passing moist pellets counter-current to a stream of hot gases, removing moist gases from the pellets, and controlling the factors of temperature and detention time, draft and moisture content of the end gases so that the gases which are separated from the pellets contain less than about .05 to .03 pound of water per pound of dry gas.

3. A method for drying pelleted acid-treated clay catalyst, which comprises passing moist pellets counter-current to a stream of hot gases, removing moist gases from the pellets, and controlling the factors of temperature and detention time, draft and moisture content of the end gases so that the gases which are separated from the pellets contain less than about .09 pound of water per pound of dry gas.

4. A method for drying pelleted acid-treated clay catalyst in a rotary drier, which comprises introducing wet pellets into one end of said rotary drier and removing dry pellets at the other end, introducing hot gases into the end of the drier contiguous to the pellet discharge, removing the moisture laden gases from the drier at a point contiguous to the pellet inlet, and controlling the temperature of the gases, the rate of feed of pellet and flow of gases, and the retention time of the pellets in the drum to remove from the drum moisture-laden gases having less than 0.09 pound of water per pound of dry gas.

5. A method for drying pelleted acid-treated clay catalyst in a rotary drier, which comprises introducing wet pellets into one end of said rotary drier and removing dry pellets at the other end, introducing hot gases into the end of the drier contiguous to the pellet discharge, removing the moisture-laden gases from the drier at a point contiguous to the pellet inlet, and controlling the temperature of the gases, the rate of feed of pellet and flow of gases, and the retention time of the pellets in the drum to remove from the drum moisture-laden gases having less than .05 to .07 pound of water per pound of dry gas.

6. A method for drying pelleted acid-treated clay catalyst in a rotary drier, which comprises introducing wet pellets into one end of said rotary drier and removing dry pellets at the other end, introducing hot gases into the end of the drier contiguous to the pellet discharge, removing the moisture-laden gases from the drier at a point contiguous to the pellet inlet, and controlling the temperature of the gases, the rate of feed of pellet and flow of gases, and the retention time of the pellets in the drum to remove from the drum moisture-laden gases having less than .05 to .03 pound of water per pound of dry gas.

7. A method for drying pelleted catalyst, which comprises passing a stream of hot gases over moist pellets, and removing moist gases from the pellets and controlling the factors of temperature and detention time, draft and moisture content of the end gases so that the moist gases which are removed from the pellets contain less than about .09 pound of water per pound of dry gas.

8. A method for drying pelleted catalyst, which comprises passing a stream of hot gases over moist pellets, removing moist gases from the pellets, and controlling the factors of temperature and detention time, draft and moisture content of the end gases so that the moist gases which are removed from the pellets contain less than about .05 to .07 pound of water per pound of dry gas.

9. A method for drying pelleted catalyst, which comprises passing a stream of hot gases over moist pellets, removing moist gases from the pellets, and controlling the factors of temperature and detention time, draft and moisture content of the end gases so that the moist gases which are removed from the pellets contain less than about .05 to .03 pound of water per pound of dry gas.

WRIGHT W. GARY.
ROBERT B. SECOR.